2,885,323
PROCESS FOR INACTIVATING URUSHIOL ON SKIN WITH CERIUM COMPOUNDS

Walter William Braun, Lewiston, N.Y., assignor to National Lead Company, New York, N.Y., a corporation of New Jersey No Drawing. Application October 13, 1952
Serial No. 314,567

7 Claims. (Cl. 167—58)

This invention relates to pharmaceutical compositions intended for application to the skin and is particularly concerned with such compositions containing compounds of cerium.

It is an object of the present invention to provide compositions containing cerium compounds which may be applied to the skin in the same manner as ordinary cosmetic creams or lotions.

A further object of the invention is to provide compositions of the character described which are useful in the treatment of dermatitis or irritation resulting from contact with poison ivy.

Another object of the invention is to provide pharmaceutical compositions of the character described in which the cerium compound contained therein is deposited on the skin in condition for use.

It has been discovered that cerium compounds, which are considered to be non-poisonous and non-irritating unless too strongly acid or oxidizing, are of value in providing relief from the skin irritation or dermatitis that frequently results from contact with the plant *Rhus toxicodendron*, commonly called poison ivy, and with other plants of the Rhus family.

The dermatitis resulting from contact with such plants is known to be caused by certain ingredients of the plant juices or sap that produce an allergic skin reaction. These allergens, which, according to the literature, have been found to be various derivatives of pyrocatechol, are often designated collectively by the term "urushiol." In the present application this term will be so used.

Urushiol is highly active. Consequently, even small amounts of it in contact with the skin may result in dermatitis. Although thorough washing of the skin after contact with a plant of the Rhus family will frequently remove the urushiol, if washing is delayed so that the urushiol is permitted to penetrate the pores of the skin and dry, it is practically impossible to remove all of it by washing. Consequently, to prevent dermatitis, or, if inflammation has already occurred, to provide relief from the resulting irritation and cause healing of the inflamed and erupted areas of the skin, it is necessary to inactivate the irritating material. This may be easily and thoroughly accomplished with cerium compounds.

While the reason for the effectiveness of cerium compounds in inactivating or sequestering urushiol is not definitely known, it is believed that the cerium compounds react with the urushiol to form stable, inert, non-irritating compounds or complexes and thus remove the source of irritation. This theory is supported by laboratory tests which have shown that urushiol is quantitatively precipitated from solution by a large number of cerium compounds.

Soluble salts of cerium such, for example, as the sulfates, chlorides, acetates, and nitrates have been found suitable for sequestering or inactivating urushiol. In addition certain insoluble cerium compounds such as hydrous cerous and ceric oxides and carbonates are also useful for the purpose. In laboratory investigation of the sequestering action it was found that when a solution or suspension of a cerium compound containing 0.3 mg. of cerium was mixed with 10 mg. of urushiol and the mixture was filtered after brief stirring, no urushiol could be detected in the filtrate by the test method employed. This was a highly sensitive method depending upon the formation of a deep green color by the reaction of ferrous ions with urushiol when as little as 6 parts per million of urushiol are present. Since approximately 0.001 mg. of urushiol per sq. cm. of skin surface is required for the production of dermatitis on sensitive people, a concentration no higher than 6 parts per million would be non-irritating.

The hydrous cerium oxides referred to above may be obtained by precipitating cold solutions of cerium salts, such as the chlorides or nitrates, with ammonia followed by filtering and washing. The products are gelatinous masses which contain an indefinite amount of water adsorbed by the oxide particles. The water content may vary within rather wide limits depending upon various factors, including particularly the conditions of precipitation. Hydrous cerous oxide must be prepared and stored in the absence of air or other oxidizing agent since it is very easily oxidized. Hydrous cerium carbonates may be formed as gelatinous masses in a similar manner by reacting solutions of cerium salts with solutions of alkali carbonates such, for example, as sodium, potassium or ammonium carbonate. Like hydrous cerous oxide, hydrous cerous carbonate must be protected from oxidation if it is desired to keep it pure. For use in accordance with the present invention, however, oxidation of the cerous compounds to ceric compounds is not important as the ceric compounds are also suitable.

If desired, soluble cerium compounds may be applied to the skin in simple water solutions and the hydrous cerium oxides and carbonates may be used as water pulps or suspensions. Since the effectiveness of the hydrous oxides and carbonates is, to at least some extent, reduced by drying them to the point where the gelatinous characteristics of the materials are lost, it has been found generally desirable to incorporate these compounds in vehicles which preserve their activity by keeping them moist while at the same time maintaining the particles in dispersed condition, thus making easier the penetration of the compounds into the pores of the skin. Vehicles of types such as are commonly used for cosmetic purposes may conveniently be used as carriers for such cerium compounds. Even soluble cerium salts may advantageously be applied in such vehicles as the normal ingredients of the vehicles are useful in soothing the irritated skin surface. The following examples illustrate compositions containing cerium compounds and utilizing several different cosmetic type vehicles.

Example I

A lotion containing cerous acetate may be formed by mixing together 30 ml. alcohol, 10 ml. glycerol, 160 ml. water and 20 grams cerous acetate. This results in a fluid product easily applied to the skin.

Example II

A composition of the vanishing cream type containing hydrous ceric oxide may be prepared in the following manner:

100 grams of stearic acid is melted and added to a mixture of 14 grams of potassium hydroxide, 18 ml. of glycerol and 250 ml. of water which has previously been heated to about 95° C. The mixture is vigorously agitated to produce an emulsion which is cooled to about 40° C. before addition thereto of 250 grams of a water dispersion of gelatinous hydrous ceric oxide containing the equivalent of 40 grams of $CeO_2$. After such addition the mixture is further agitated until it attains a smooth consistency. The cream produced is soft, is easily applied to and absorbed by the skin, and facilitates the application and spreading of the hydrous ceric oxide.

Example III

In this example there is described a method of preparing a composition of the cold cream type containing hydrous ceric oxide.

A mixture of 160 grams petrolatum, 120 grams paraffin wax, 300 grams mineral oil and 220 grams glyceryl monostearate is heated to about 80° C. 1000 grams of an aqueous suspension of gelatinous hydrous ceric oxide, containing the equivalent of 50 grams of $CeO_2$, is also heated to about 80° C. and added slowly to the above-mentioned mixture with vigorous agitation. The smoothness of the cream is usually somewhat improved if it is passed through an emulsifier or colloid mill.

Example IV

A somewhat thicker lotion than that described in Example I and containing hydrous ceric carbonate as the active ingredient may be produced in the following manner:

To a vessel containing 30 ml. alcohol, 10 ml. glycerine, and 120 ml. water there is added 55 grams of gelatinous hydrous ceric carbonate pulp, containing the equivalent of 16 grams $CeO_2$. The mixture is agitated until homogeneous. It is then heated to 100° C. and 7 grams of a commercial ethylene glycol stearate containing about 6 percent of potassium stearate is added. The mixture is vigorously stirred during cooling to disperse the ethylene glycol stearate and a thick, creamy lotion is obtained in which the hydrous ceric carbonate remains suspended.

It will be understood that the compositions described in the foregoing examples are merely illustrative of different types of compositions in which cerium compounds may be applied to the skin and that any requisite variations may be made in the processes described or in the ingredients and proportions of ingredients of the cosmetic bases to produce creams, lotions, or ointments having desired properties. Thus, for example, other emulsifiers than those specified may be employed and various oils, waxes, humectants, perfumes, and the like may be added or substituted in desired proportions. A plurality of cerium compounds may also be used if desired. Although the relative inactivity of the hydrous cerium oxides and hydrous cerium carbonates is such that reaction between these compounds and ingredients of the creams or lotions is unlikely, the cerium salts are, of course, more reactive and care must therefore be employed to avoid, in creams or lotions containing cerium salts, the use of ingredients which will react with the salts, destroying their activity and interfering with their sequestering of urushiol.

I claim:

1. A process for inactivating urushiol and rendering it non-irritating to the skin which comprises reacting it with a cerium compound.

2. A process for inactivating urushiol as set forth in claim 1 in which said cerium compound is a hydrous oxide of cerium.

3. A process for inactivating urushiol and rendering it non-irritating to the skin which comprises reacting it with a cerium compound selected from the group consisting of the chlorides, sulfates, acetates, nitrates, hydrous oxides and hydrous carbonates of cerium.

4. A process for inactivating urushiol deposited on the skin which comprises applying to the affected area of the skin a composition comprising a cosmetic base and a cerium compound.

5. A process for inactivating urushiol as set forth in claim 4 in which said cerium compound is selected from the group consisting of the chlorides, sulfates, acetates, nitrates, hydrous oxides and hydrous carbonates of cerium.

6. A process for inactivating urushiol as set forth in claim 4 in which said cosmetic base is an emulsified cream.

7. A process for inactivating urushiol as set forth in claim 4 in which said cerium compound is a hydrous oxide of cerium.

References Cited in the file of this patent

UNITED STATES PATENTS 2,236,387      Wallace               Mar. 27, 1941

OTHER REFERENCES

Ludwig: Repertorium pharmaz., Spezial-praparate, 1948, Beobachter, Basel, p. 182.

Rau et al.: Clin. Med., September 1942, pp. 256, 257.

Cronk: J. Lab. and Clin. Med., June 1951, p. 909.

Janistyn: Riechstaffe Seifen Kosmetika, vol. 1, Huthig, Heidelberg, 1950, pp. 85–85.

Schwartz et al.: Am. Prof. Pharm., June 1942, p. 378.